Dec. 30, 1969    A. C. GUYTON    3,487,297
SUSPENDED MEMBRANE DIFFERENTIAL OXYGEN ANALYZER
Filed June 8, 1967    7 Sheets-Sheet 1

*Arthur Clifton Guyton*

INVENTOR

Dec. 30, 1969  A. C. GUYTON  3,487,297
SUSPENDED MEMBRANE DIFFERENTIAL OXYGEN ANALYZER
Filed June 8, 1967  7 Sheets-Sheet 2

Arthur Clifton Guyton
INVENTOR

Dec. 30, 1969          A. C. GUYTON          3,487,297
SUSPENDED MEMBRANE DIFFERENTIAL OXYGEN ANALYZER
Filed June 8, 1967          7 Sheets-Sheet 3
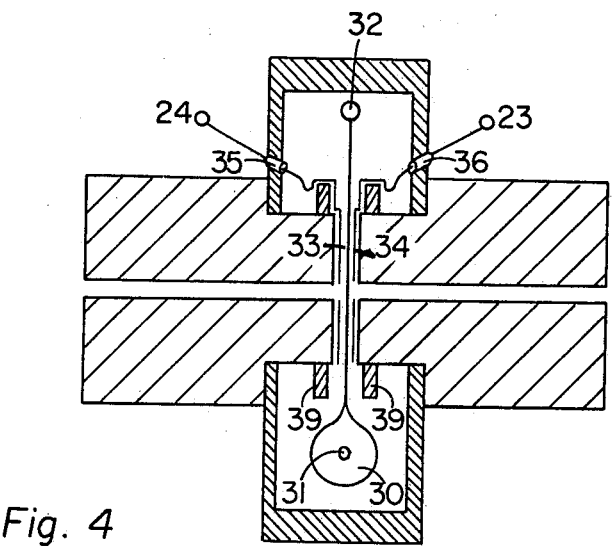
Fig. 4
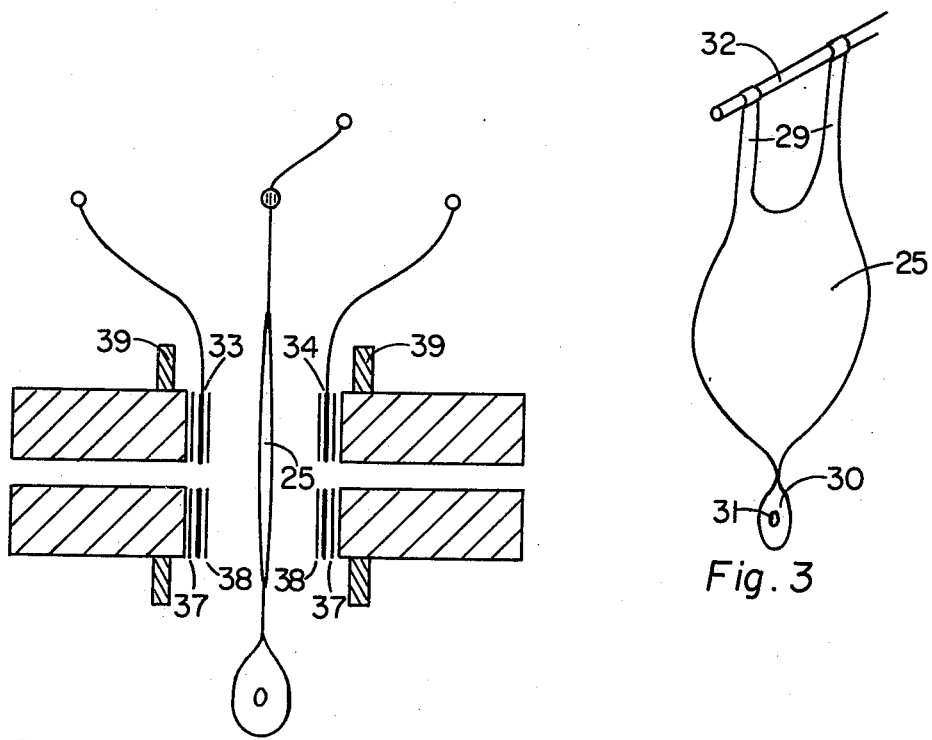
Fig. 5
Fig. 3
Arthur Clifton Guyton
INVENTOR Dec. 30, 1969        A. C. GUYTON        3,487,297

SUSPENDED MEMBRANE DIFFERENTIAL OXYGEN ANALYZER

Filed June 8, 1967        7 Sheets-Sheet 4

Arthur Clifton Guyton
INVENTOR

INVENTOR
Arthur Clifton Guyton

United States Patent Office 3,487,297
Patented Dec. 30, 1969

3,487,297
SUSPENDED MEMBRANE DIFFERENTIAL OXYGEN ANALYZER
Arthur Clifton Guyton, Hinds County, Miss.
(234 Meadow Road, Jackson, Miss. 39206)
Filed June 8, 1967, Ser. No. 644,602
Int. Cl. G01r 33/12
U.S. Cl. 324—36
7 Claims

ABSTRACT OF THE DISCLOSURE

An apparatus for measuring the difference between oxygen concentrations in two gas mixtures, consisting basically of a thin membrane suspended in a strong magnetic gap, with provision being made for one gas sample to be passed through the magnetic cap on one side of the membrane and the other gas sample on the other side of the mebrane, the paramagnetic attraction of oxygen into the magnetic gap causing a force against the membrane away from the gas sample having the higher concentration of oxygen. Several methods for detecting the force against the membrane: (1) direct measurement of displacement of the membrane to one side, (2) a photoelectric detector of displacement, this activating a servo feedback to the membrane to oppose the displacement, and the magnitude of the required feedback being a measure of the oxygen concentration difference, and (3) a capacitative detector of displacement, this activating a similar servo feedback.

---

This invention relates to apparatus for measuring the difference between oxygen concentrations in two gas mixtures, and it has as its primary purpose to provide a new means for analyzing the concentration or partial pressure of oxygen in air or in other gas combinations. This analyzer utilizes the paramagnetic property of oxygen to measure its concentration. It is based on a new principle that allows almost instantaneous analysis of oxygen concentration.

Many different types of oxygen analyzers are known, and oxygen analyzers are in use utilizing the paramagnetic property of oxygen for measurement of the oxygen concentration in air or other gaseous mixtures. However, because of the minuteness of the forces that can be created as a result of the paramagnetic property of oxygen in a strong magnetic field, the paramagnetic types of oxygen analyzers presently in use are very sluggish in response and therefore cannot be used for recording concentrations of oxygen that change rapidly. The basic principle of these is to measure the buoyancy of oxygen in a magnetic field, which is different from the basic principle of the invention setforth in this application, said invention not utilizing the buoyancy principle.

Therefore, it is the main purpose of the invention to provide a rapidly responding oxygen analyzer that is capable of faithfully measuring oxygen concentration either when the concentration remains static over long periods of time or when the concentration changes rapidly during a fraction of a second.

It is a further purpose of the invention to provide a means for measuring the difference in concentration of oxygen between two separate samples of gases, the analyzer having two separate inlet ports through which the two samples of gas can enter, and the instrument having the ability to record the difference between the oxygen concentrations in the two gas samples.

A further object object of the invention is to provide an electrical output that is directly and linearly proportional to the concentration of oxygen in a sample gas.

It is a further object of the invention to provide a means for pulling the gas sample into the analyzer at an exactly controlled rate so that the time variation in concentration of oxygen in the sample will be faithfully reproduced.

It is a further object of the invention to provide a powerful magnetic field in a narrow gap between the two poles of a magnet, and in which is suspended a thin aluminum membrane, onto the two sides of which are impinged a sample gas on one side and a reference gas on the other side, this arrangement causing the membrane to move away from the gas that has the higher concentration of oxygen because the powerful magnetic field causes oxygen, a paramagnetic gas, to accumulate within the gap.

It is a further object of the invention to enclose the magnetic gap and thin membrane in an air tight chamber which is semi-evacuated so that both the sample air and the reference air can be pulled into the chamber. Small holes are provided through the middles of the magnetic pole pieces so that sample gas and reference gas can pass through the two respective pole pieces into the magnetic gap, the gases issuing onto the respective sides of the thin aluminum membrane.

It is a further object to provide a heating system to heat the sample and reference gases prior to their entrance into the semievacuated chamber, the purpose of this being to prevent condensation of moisture within the chamber.

It is a further object of the invention to provide an electronic feedback circuit that detects any movement of the membrane from its normal resting position in the middle of the magnetic gap and which then provides electrostatic, electromagnetic, or other type of feedback to the aluminum membrane to provide motive power to oppose the movement; an electrical output is provided from the electronic circuit that is proportional to the motive force feedback that acts on the thin membrane; the electrical output is then a direct measure of the oxygen concentration.

It is a further object of the invention to provide in the electronic circuit appropriate damping circuitry to prevent oscillation of the aluminum membrane and therefore also to prevent undulations in the output signal.

A further object of the invention is to provide in the electronic circuit a means for changing the degree of damping so that mean values of oxygen concentration can be recorded when desired rather than instantaneous values.

It is a further object of the invention to provide a means for sensing movement of the membrane from its resting position, this sensing being provided in any one of a number of different ways, among which is a photoelectric sensor, a capacitative sensor utilizing change of capacitance in a carrier wave circuit, or any other means for detecting very minute movement of the membrane.

It is a further object of the invention to provide an accessory motive force to the membrane, besides that from the servo-amplifier, for the purpose of zeroing the instrument at any desired reference level of oxygen concentration. The accessory motive force can be provided by an accessory electrostatic or electromagnetic feedback to the suspended membrane, or it can be provided by mounting the magnetic sensor of the analyzer in a yoke that can be rotated with respect to the gravitational pull of the earth in such a way that gravity will pull the suspended membrane in one direction or the other.

It is a further object of the invention to provide an adjustment in the electronic circuit which allows the range of the oxygen analyzer to be changed at will so that greater or lesser ranges of concentration of oxygen can be recorded by the output of the analyzer.

Further and more specific purposes and objects will become evident from the following specification.

The invention is illustrated in the accompanying drawings which show one method of applying the new principle for oxygen concentration analysis along with examples of alternate means for applying the same principle. Obviously, the method that is shown serves mainly the purpose of explaining the principle of the invention and one of the best means of applying said principle, but does not show the only way of practical application of the invention. Modifications of the invention, some of which will be described or foreshadowed by the detailed specification or will be obvious to experts skilled in the art, are therefore not necessarily departures from the invention.

In the drawing:

FIGURE 3 illustrates the thin aluminum membrane which hangs in the magnetic gap between the pole pieces.

FIGURE 4 illustrates a vertical sectional view of the oxygen sample chamber and the magnetic pole pieces taken along line 4—4 of FIGURE 1, showing the membrane hanging freely in the gap between the pole pieces.

FIGURE 5 illustrates an expanded view of the magnetic gap in the oxygen sample chamber.

Figure 1:
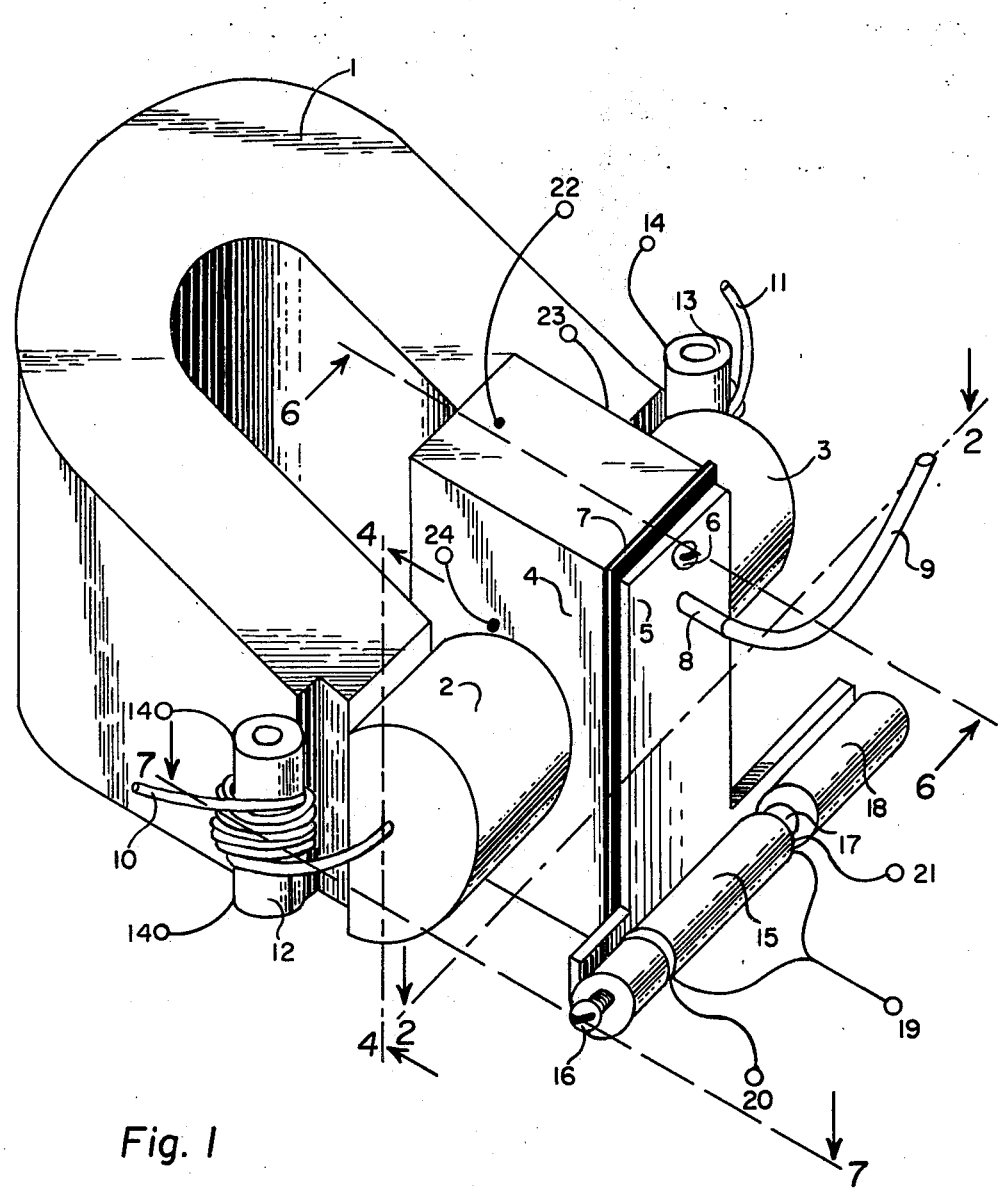
FIGURE 1 is a general view of the oxygen analyzer, representing the invention in its most generally applied form.

To describe the function of the oxygen analyzer:

It will be noted in FIGURE 1 that a central feature is the large permanent magnet 1, having two soft iron pole pieces 2 and 3 resting on the north and south poles of the magnet respectively. Extensions of the pole pieces project into an oxygen sample chamber 4 constructed of brass. These extensions will be described in detail later as the interior of the oxygen sample chamber is considered. The oxygen sample chamber has a cover 5 held tightly in place by screw 6 and another screw at the bottom which is not seen in the figure. Gasket 7, made of soft rubber and sealed in place with an appropriate sealant, makes the connection airtight between the cover of the oxygen sample chamber and its main body. Tube 8 protruding from the oxygen sample chamber and then extended by a rubber hose 9 connects to a regulated vacuum source, and air is pulled continually from the oxygen sample chamber.

Located at the external end of each pole piece of the magnet is a coiled copper tube 10 and 11 having an internal bore of approximately 0.007 inch, each of which is open at one end and the other end of which leads into a central hole, approximately ⅛ inch in size, that protrudes all the way through each respective pole piece and thence into the magnetic gap between the ends of the two pole pieces. The vacuum from hose 9 pulls equal samples of gas through copper tubes 10 and 11 respectively.

The coiled copper tubes are wound around power resistor heaters 12 and 13, respectively. The terminals 14 from the heaters are energized by alternating current having no other purpose than simply to provide heat to the coiled tube.

Located at the bottom of the front of the oxygen sample chamber and attached to its cover 5 is a system for holding and positioning a pair of photocells. The two photocells are inside the brass block 15. This block is movable but is held tightly in place between the end of screw 16 and a spring loaded plunger 17. The spring for loading the plunger is located in housing 18. When the screw is turned clockwise, the photocell housing 15 moves to the right, and, conversely, it moves to the left when screw 16 is rotated counterclockwise. Electrical terminal 19 connects to one wire from each of the photoconductive cells. Electrical terminals 20 and 21 connect respectively with the second wires of the two photoconductive cells.

Electrical terminal 22 connects to the oxygen sample chamber and thereby is in electrical communication with all the metal parts of the oxygen sensor, including the oxygen sample chamber itself, the magnetic pole pieces, the magnet, the membrane in the magnetic gap, the photocell housing, and other metal parts.

Electrical terminals 23 and 24 connect respectively to two electrostatic deflection plates, one located on the face of each of the respective pole pieces as will be described later.

Figure 2:
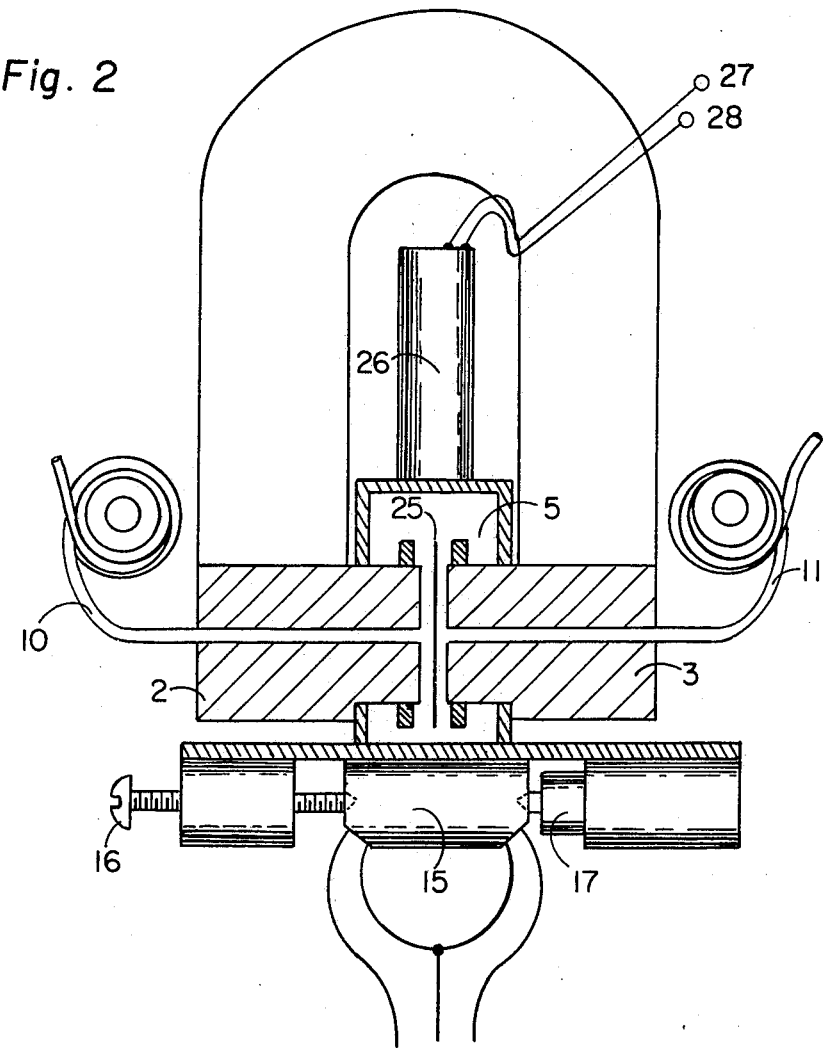
FIGURE 2 is a top view of the oxygen sensor, showing a horizontal sectional view of that part of the sensor through the magnetic pole pieces and oxygen sample chamber, this section being taken along line 2—2 of FIGURE 1.

FIGURE 2 illustrates a top view of the oxygen sensor system, but with a horizontal section through the oxygen sample chamber 5, through the magnetic pole pieces 2 and 3, and through the thin aluminum membrane 25 suspended in the powerful magnetic field between the two pole pieces.

FIGURE 2 illustrates the air passage routes through coiled copper tubes 10 and 11 and shows how the two samples of air impinge respectively on the two sides of the thin aluminum membrane 25.

FIGURE 2 also illustrates light housing 26 located in the throat of the magnet and located at the same level as the photocell housing 15, the level of which can be seen in FIGURE 1. Light from the light housing 26 passes through the oxygen sample chamber and impinges on the photoconductive cells in housing 15 as will be described later. This light passes below the magnetic gap rather than through the magnetic gap, as will also be described later. This figure illustrates a top view of the mounting of photocell housing 15 between screw 16 and spring loaded plunger 17.

Electrical terminals 27 and 28 supply alternating current electricity to the light housed in light housing 26.

The basic principle of the invention can be explained best by referring to FIG 2. If two different gases are supplied through inlet tubes 10 and 11, respectively, and these gases are flowing gently into the magnetic gap, then the membrane 25 will be pushed by the gas which has the greater amount of oxygen. The reason for this is that oxygen exhibits paramagnetic tendencies and is attracted powerfully into the magnetic gap; therefore, greater quantities of the gas sample will be pulled into the gap on the side which has the higher oxygen concentration. It is immaterial how the membrane is suspended in the magnetic gap; whether it be suspended by straps or whether it be suspended from all sides, the principle still applies. However, another feature that is important in the function of the basic principle is that no other forces besides that caused by the oxygen concentration difference be allowed to move the membrane. Such a state as this is achieved by maintaining steady flow of gases through the system. However, it must be emphasized that any means by which the two separate gases can be maintained on the two sides of the membrane will be satisfactory and will cause movement of the emmbrane away from the oxygen. Therefore, the basic invention is the development of instrumentation for measuring oxygen concentration difference between two gases based on this principle of oxygen pressure against a membrane in a powerful magnetic gap regardless of the means by which the membrane is suspended and regardless of the means by which the two gas samples on the two sides of the membrane are moved into the gap on the respective sides of the membrane and regardless of how the gases are maintained in the spaces on the two sides of the membrane.

FIGURE 3 illustrates a detailed plan of the thin aluminum membrane that hangs in the magnetic gap. This consists of three major portions: the main body of the membrane 25, the two straps 29 from which the membrane hangs and an extended portion 30 of the membrane hanging below its main body. This extended portion is twisted so that it hangs at right angles to the main body of the membrane. The function of the extended portion is to block light passage from the light housing to the photoconductive cells except that small portion of light that passes through pinhole 31.

The membrane hangs by its straps from post 32. FIGURE 4 illustrates post 32 extending from the back of the oxygen sample chamber toward the front and also illustrates the membrane hanging in the magnetic gap.

FIGURE 4 also illustrates the internal layout of the oxygen sample chamber showing on the faces of the pole pieces electrostatic deflection plates 33 and 34. These are attached to the faces of the pole pieces but are insulated from them. These electrostatic plates are made of thin aluminum foil. Electrical wires lead from the electrostatic plates to the exterior of the oxygen sample chamber through holes 35 and 36, attaching respectively to terminals 24 and 23.

FIGURE 5 illustrates an expanded view of the magnetic gap, the hanging membrane, and the electrostatic deflection plates located on the faces of the pole pieces. The electrostatic deflection plates 33 and 34 are insulated from the magnetic pole piece faces by ½ mil thick paper insulators 37. The surface of each electrostatic deflection plate that is exposed to the magnetic gap is also insulated by a thin ½ mil thick paper insulator 38. This insulator facing the gap prevents shorting between the membrane and the deflection plates if the membrane moves excessively to one side of the middle.

At the points shown in FIGURE 4 where the wires pass out of the oxygen sample chamber from the electrostatic deflection plates, the holes are sealed with epoxy plastic to keep the oxygen sample chamber airtight.

Shown in FIGURES 4 and 5 is a brass ring 39 located around each pole piece approximately 1/64 inch away from the face of the pole pieces. When air flows into the magnetic gap on each side of membrane 25 and then flows between the membrane and the electrostatic deflection plates it pours in all directions out from between the membrane and electrostatic plates. The brass rings 39 keep the air traveling smoothly away from the magnetic gap and also keeps stray air within the oxygen sample chamber from entering the magnetic gap from directions other than through the central holes of the pole pieces. This prevents mixture of the two sample airs with air that is already present in the oxygen sample chamber and thereby increases the sensitivity of the oxygen measurement.

Figure 7:
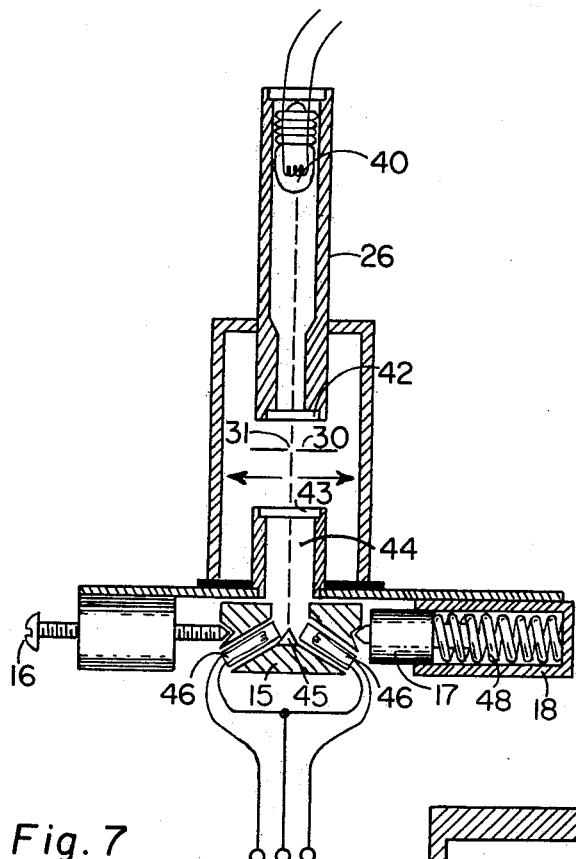
FIGURE 7 is a horizontal sectional view taken along line 7—7 of FIGURE 1 and showing light transmission through the pin hole in the membrane and thence impinging on two photoelectric cells located in a movable carrier.
Figure 6:
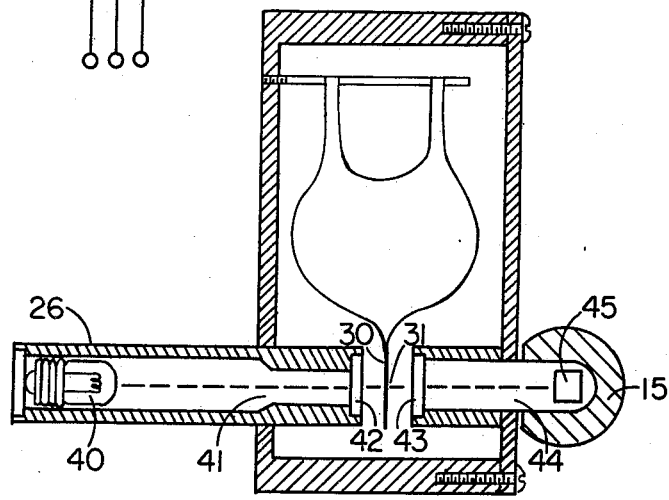
FIGURE 6 is a vertical sectional view of the oxygen sample chamber taken along line 6—6 in FIGURE 1 and showing transmission of light through a pin hole in the lower part of the membrane.

FIGURES 6 and 7 show the arrangement of the optical system for transmission of light through the pinhole of the extended membrane, and shows impingement of this light on the photoconductive cells. Light 40 is located at the rear of light housing 26, and light from this passes through hole 41 and through its glass cover 42 onto the extended portion 30 of the membrane containing its pinhole 31. The inside of light housing 26 is painted with a flat black paint to prevent reflected light. The glass window 42 is sealed over hole 41 with an airtight seal to maintain airtight integrity of the oxygen sample chamber.

Light which passes through pinhole 31 proceeds on through glass window 43 and through hole 44 finally into photocell housing 15 where there is located a silvered prism 45 which reflects the light beam onto one or the other of the photoconductive cells 46.

Window 43 is also sealed in place to prevent leakage of air.

The photoconductive cells 46 are located in small holes drilled in the photocell housing 15, and the faces of these photoconductive cells abut against the base of the silvered prism. When the beam of light is to one side of the angle of the prism, essentially all of the light impinges on one of the photocells; then when the beam of light moves to the opposite side of the angle, essentially all of the light passes to the other photocell. Thus, the two photocells, when used in an appropriate bridge circuit can detect when the beam of light is split exacely between the two cells. Therefore, the photocell system is used to detect whether or not the membrane is to one side of the central position or precisely centered, which is detected by equal conductivity by the two photoconductive cells.

By turning screw 16, the photoconductive cell housing, including the two photoconductive cells and the beam splitting prism, can be moved from side to side and can therefore be adjusted to the precise position that represents membrane positioning in the very center of the magnetic gap.

FIGURE 7 illustrates the manner in which plunger 17 is spring loaded by spring 48 located in the spring housing 18.

Figure 8:
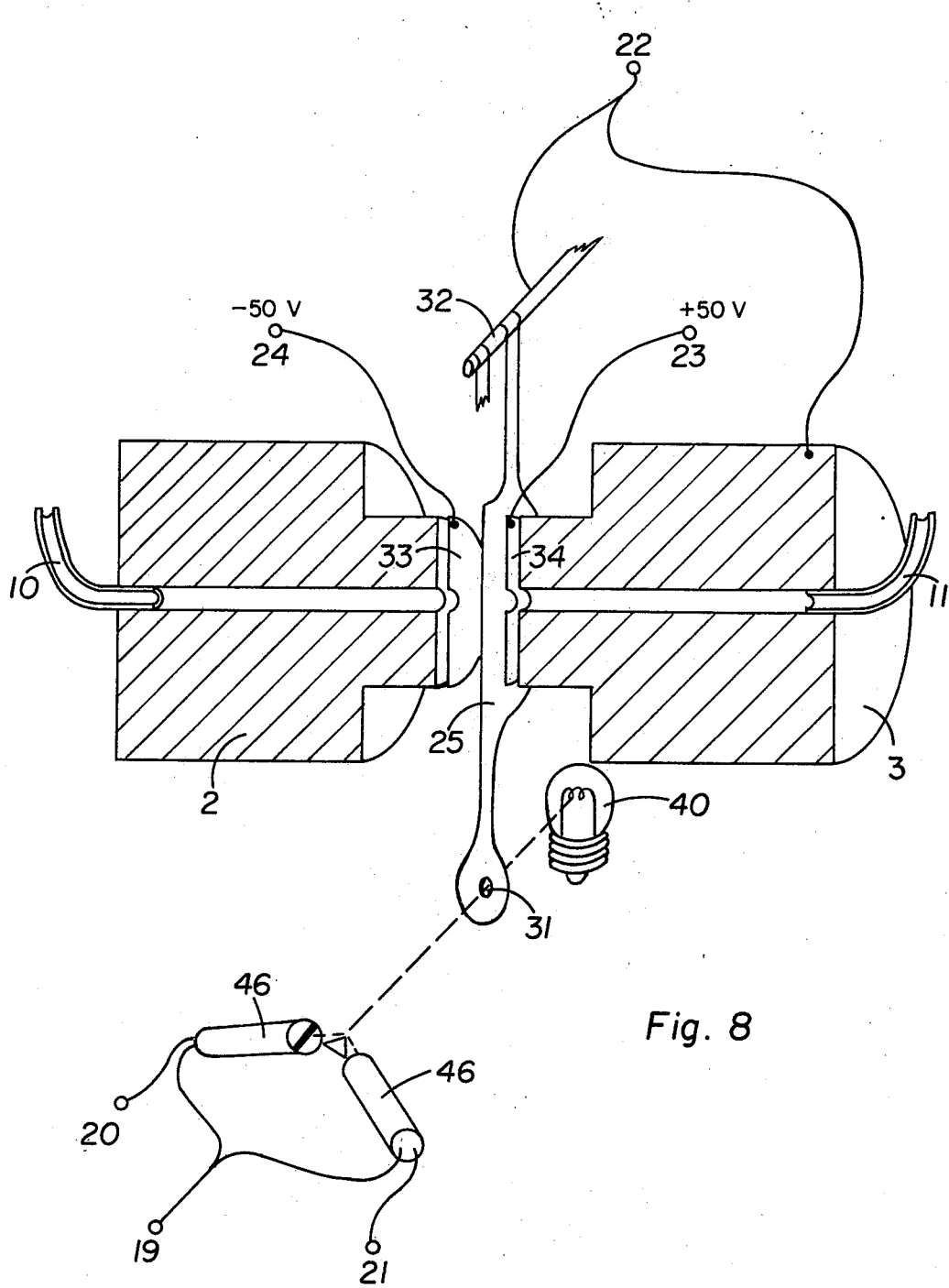
FIGURE 8 is a functional diagram of the essential elements of the oxygen sensor unit, aside from the magnet, the vacuum source, and the electronic control unit.

FIGURE 8 illustrates a functional diagram of the oxygen sensor which may be described as follows: gas samples are pulled into the oxygen sample chamber through tubes 10 and 11, and the gases from the two tubes pass into the narrow spaces between membrane 25 and the electrostatic deflection plates 33 and 34. As the two gas samples pass through the magnetic field, the oxygen, because of its paramagnetic property, tends to be held in the magnetic gap. If more oxygen is present in one of the two samples than in the other, then there will be greater tendency to hold the sample in the gap on that side of the membrane than on the other side of the membrane. As a result this causes a buildup of pressure on the side of the membrane having the greater amount of oxygen, which in turn pushes the membrane in the opposite direction. Because of the extremely lightweight of the membrane, only a few milligrams, even a very minute force will cause movement of the membrane that can be seen with the naked eye. In other words, the membrane acts as a comparator between the oxygen concentrations in the two gas samples flowing in the two respective air gaps on the two respective sides of the membrane.

If the membrane is pushed to the right, light through pinhole 31 strikes the right face of the prism and increases the conductivity of the right photoconductive cell 46. The electrical outputs from the two photoconductive cells feed into a bridge circuit 79 and thence into an operational amplifier 59, the output of which 83 is impinged through a resistance network 84 upon electrical terminal 22 of the oxygen sensor. This terminal is connected directly to the main body of the oxygen sensor and also through the metal structure of the sensor to the hanging membrane 25. A positive voltage, plus 50 volts, is applied through electrical terminal 23 to electrostatic deflection plate 34. Likewise, minus 50 volts is applied through terminal 24 to electrostatic deflection plate 33. When the potential on the hanging membrane 25 is zero, it is neither attracted to nor repelled by either of the two electrostatic deflection plates 33 and 34. However, if the potential becomes positive on membrane 25, it will be deflected toward the negative electrostatic deflection plate 33, and, conversely, when a negative potential is applied to membrane 25, it will be deflected toward the positive electrostatic deflection plate.

The polarities in the electronic system are so arranged that the output of the operational amplifier 59 will move membrane 25 in the opposite direction from that in which it is displaced by the pressure of excess oxygen on one of its sides. In other words an electrical voltage is automatically applied to membrane 25 to give an electrostatic force exactly equal to that amount necessary to return pinhole 31 to its original position. The amount of electrical potential required to return pinhole 31 to its original position is directly proportional to the oxygen pressure that is applied to the opposite side of the membrane, and this oxygen pressure in turn is directly proportional to the difference between the oxygen concentration on the two sides of the membrane. Therefore, the electrical output of the operational amplifier is a direct measure of the oxygen concentration difference between the two samples of air entering tubes 10 and 11.

Figures 9, 12:
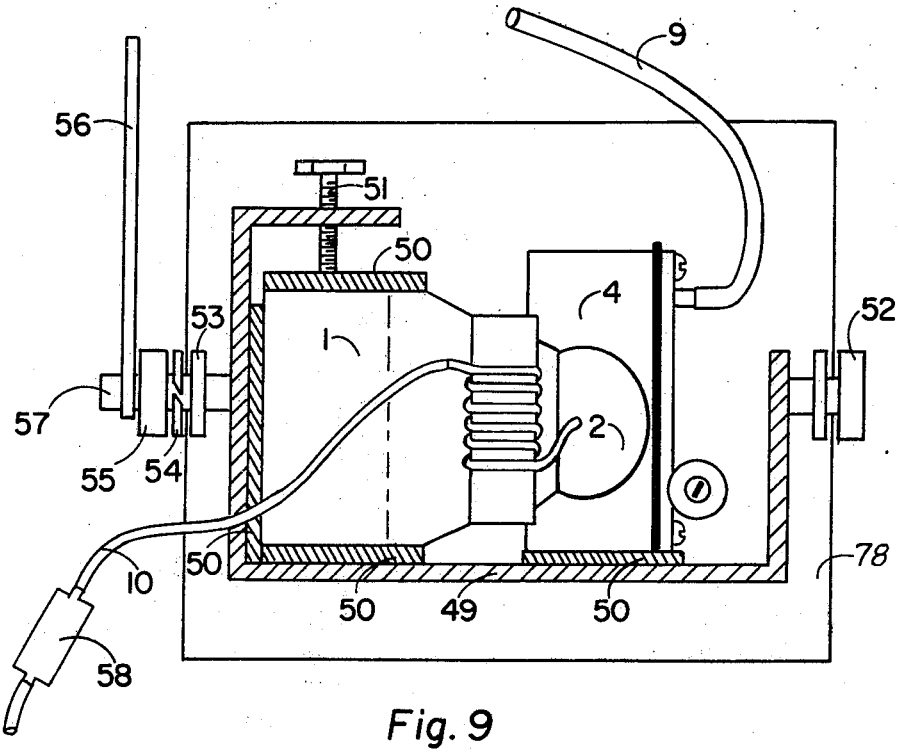
FIGURE 9 illustrates mounting the oxygen sensor unit in a yoke that can be oriented with respect to the pull of gravity, and showing also its mounting in a heat box with thermostatically controlled temperature.
FIGURE 12 illustrates a modified operational system utilizing electrostatic detection of position of the membrane and electromagnetic feedback for repositioning the membrane to its neutral position.

FIGURE 9 illustrates the mounting of the oxygen sensor system in a yoke that can be positioned with respect to gravity in such a way that membrane 25 can be moved slightly to one side or the other by gravitational pull; this provides a means for zeroing the instrument because gravity pulls the membrane to one side or the other. The main body of the oxygen sensor, consisting of magnet 1 and oxygen sample chamber 4, is insulated from the yoke 49 by plastic insulators 50. The oxygen sensor unit is held in the yoke very tightly by tightening screw 51.

The yoke in turn is mounted inside a heat tight box 78 by two bearings 52 and 53. At bearing 53 movement of the joint is impeded by a tight lock washer 54 held in place by nut 55. A handle 56 attaches to shaft 57 which in turn attaches to the yoke in such a way that the handle can be used for rotating the entire yoke and oxygen sensor about the two bearings.

Also shown in FIGURE 9 is a vacuum tube 9 and sample air tube 10 entering the heat tight box. Air entering sample tube 10 first passes through a small filter 58 filled with glass wool which prevents trash from entering the sampling system.

Figure 10:
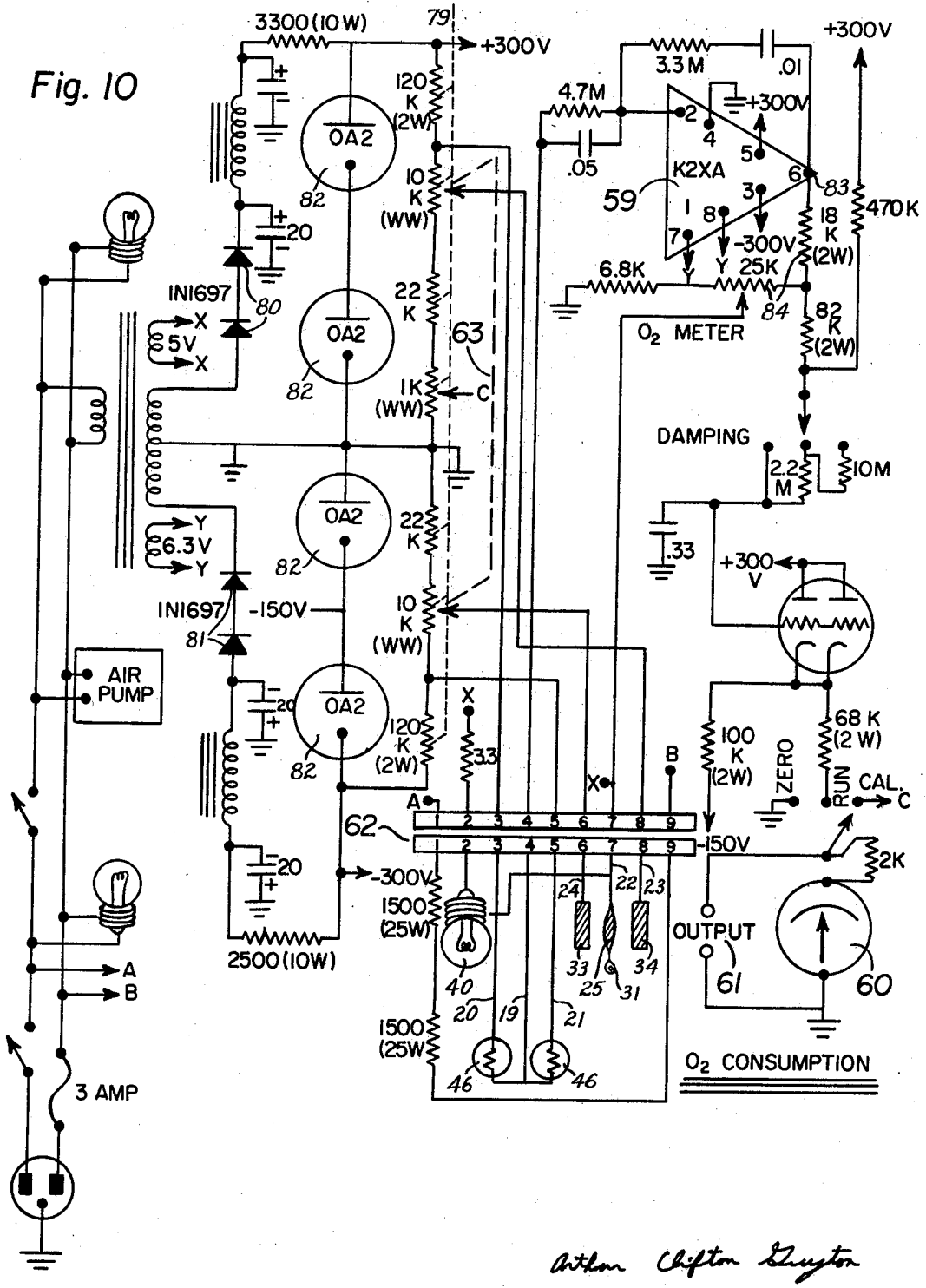
FIGURE 10 illustrates the electronic control unit and readout system for the oxygen analyzer.

FIGURE 10 illustrates the electronic feedback circuit for positioning membrane 25 in its appropriate reference position. In general this is a standard electronic feedback circuit having both positive 80 and a negative 81 DC current rectifier systems, the voltages of which are stabilized with voltage regulator tubes 82, and having a standard DC operational amplifier 59. A voltage divider bridge circuit 79 is provided for zeroing the operational amplifier and for providing calibration voltages in the output of the system. The electrical output 83 from the operational amplifier provides the electrical feedback through resistance network 84 and through electrical terminal 22 to membrane 25 to reposition it to its reference position at all times. As pointed out above, the amount of voltage that must be applied to the membrane is a direct measure of oxygen concentration difference between the two sides of the membrane. Therefore, this electrical output can be utilized as an output of the instrument to read out oxygen concentration difference. This readout is provided either on meter 60 or at output terminals 61. The electrical connections between the electronic circuit and the oxygen sensor unit are provided through connector block 62.

A special feature of the electronic circuit is an electrical zeroing system provided by the double ganged potentiometer 63. The outputs from the two rotors of this potentiometer provide the positive and negative voltages for the electrostatic deflection plates 23 and 24. These outputs can be made more positive or more negative in such a way that membrane 25 can be repositioned to its zero reference position without movement of the yoke illustrated in FIGURE 9. In other words, there is both a mechanical zeroing system and an electrical zeroing system. The mechanical zeroing system is ordinarily utilized for making gross adjustments for zeroing the instrument, whereas the electrical zeroing system is utilized for sensitive adjustments.

The instrument can be adapted for measuring oxygen concentration between the two sides of the membrane in almost any range from changes as little as 0.1 percent difference up to 100 percent difference.

Also, the instrument can be arranged to read out in terms of oxygen partial pressure difference rather than in terms of percentage concentration difference. In actuality, it is partial pressure difference that the instrument measures. However, when the barometric pressure remains constant on the outside of the instrument it can also be calibrated in terms of percentage difference.

In usual operation of the instrument, a sample gas is fed into one of the two input tubes 10 and 11, and a reference gas is fed into the opposite input port. For many purposes the reference gas can be normal room air, in which case the output of the analyzer reads the partial pressure of oxygen difference (or oxygen concentration difference in percentage if the instrument is calibrated in this way) between the room air and the sample air. Another usual use of the instrument is to use pure nitrogen as the reference gas (or any other non-paramagnetic gas). When nitrogen is used as the reference gas, the output from the instrument will be partial pressure of oxygen in absolute values, or concentration of oxygen in absolute values if the instrument is calibrated in terms of concentration.

Likewise, 100 percent oxygen can be used as the reference gas. In this case the output of the instrument will be the difference between 100 percent oxygen and the concentration of the gas in the sample.

The range of the instrument can be adjusted by changing the width of the magnetic gap, by changing the strength of the magnet, by changing the vacuum applied to pull the gas through the air gap, by changing the electrical potential difference between the positive and negative electrostatic deflection plates, or by changing the voltage range of the meter which reads out the electrical feedback potential applied to membrane 25. Any one or combination of these changes can be used to set the range of the instrument to almost any desired range from a total range as little as $\frac{1}{10}$ of one percent oxygen concentration difference to a total range of many atmospheres difference. The instrument has been used to measure oxygen concentration differences as little as 0.01 percent difference, which is a partial pressure difference of oxygen between the two sides of the membrane of less than $\frac{1}{10}$ of one mm. Hg.

The stability of the instrument depends slightly upon the stability of the vacuum which pulls air through the oxygen sample chamber. If the two input ports 10 and 11 have almost exactly the same input resistances, stability of the vacuum is not critical, but, nevertheless, in ordinary use of the instrument a standard vacuum control unit is utilized. Also, when the vacuum becomes too little, the sensitivity of the instrument decreases. Conversely, if the vacuum increases to too high a level and the airflow becomes too great through the system, turbulence develops, and the output of the system develops noise. Therefore, the vacuum is adjusted to a level slightly below that which will cause turbulence, this level of adjustment providing maximum sensitivity without noise.

Because of the very lightweight of membrane 25 and because of the servo feedback nature of the instrument, the analyzer is capable of detecting changes in oxygen concentration that occur in small fractions of a second. In the electronic circuit, a resistor-capacitor network is provided between the output and input of the operational amplifier to damp the movement of the membrane and therefore to prevent oscillation of the membrane. When this is critically damped, the instrument as it is now constituted comes to full equilibrium in one-quarter to one-half second. However, other changes in the instrument, such as making the size of the gap smaller, such as providing the instrument with anticipatory damping characteristics, such as use of an electrostatic position sensor rather than a photoelectric position sensor, such as cutting the gap distance smaller, such as providing higher airflow under streamlined conditions, and so forth can reasonably be expected to decrease the response time down to levels as low as 1/10 second or perhaps even lower.

Because of the rapid response of the instrument, it can be used for dynamic recording of oxygen concentration changes. A typical use of the instrument for this purpose is in recording breath by breath changes in cencentration of oxygen in expired air, either for experimental purposes or for patient treatment purposes such as in conjunction with anesthesia machines during the administration of anesthetics.

The resistance provided in coiled copper tubes 10 and 11 is important in isolating the response of the instrument from pressure changes that occur at either one of the two inlet ports. When the resistance is very high in the two copper coiled tubes slight changes in pressure at either one of the two inlet ports plays little role in determining movement of air into the oxygen sample chamber. This is the purpose of the very small bore of the copper tubes, namely, to provide a considerable pressure drop within the copper tube itself so that pressure changes at the inlet port will have very little effect on sample gas flow through the magnetic gap.

The heaters around which the inlet copper tubes 10 and 11 are wound prevent condensation of moisture within the tube itself or within the oxygen sample chamber. The location of the oxygen sensing system in a heat-tight box allows the entire oxygen sensor unit to be heated by the two heaters 12 and 13 and therefore further prevents condensation of moisture within the system.

An alternative heater system that can be used, and has been used, is a thermostatically controlled heater system within the heat-tight box which maintains an exact temperature in the entire box. An extra purpose for maintenance of an exact temperature in such a thermostatically controlled heat-tight box is to maintain higher degree of accuracy in calibration, because the paramagnetic properties of oxygen change with temperature. However, in practical application, changes in temperature as great as ±20 degrees centigrade have not caused serious changes in calibration of the instrument.

The output of the instrument is linearly related to the oxygen concentration difference between the two sides of membrane 25, and calibration accuracy can be achieved in a thermostatically controlled heat box to as little as 0.01 percent oxygen concentration (or less than 1/10 mm. Hg oxygen pressure difference) when the range of the instrument is set for full scale reading of 0.5 percent oxygen concentration.

Obviously, there are many different possible modifications of the instrument which are not departures from the essential nature of the invention. One modification of the instrument is a direct readout of oxygen concentration difference from the movement of the membrane in the magnetic field without using a servo-feedback system. This can be done by using an optical system with the shadow of the membrane being magnified and cast on an appropriate opaque ground glass viewing glass. The shadow can also be impinged on the face of a photocell in such a way that the output of the photocell can lead directly to a meter for readout.

Another alternative method for readout is to measure the change in capacitance between the membrane and one of the faces of the magnetic pole pieces. This can be achieved by use of an oscillator and an appropriate bridge circuit.

Figure 11:
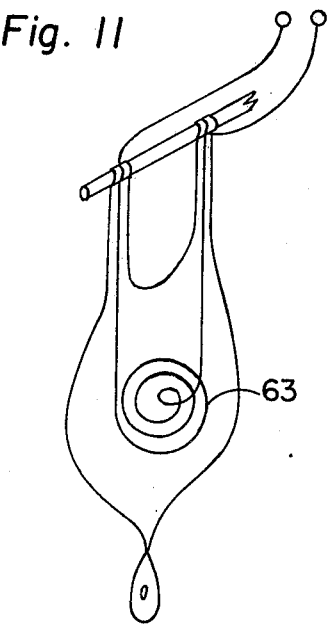
FIGURE 11 illustrates a modification of the membrane shown in FIGURE 3, this time showing a thin spiral coil of wire capable of creating a magnetic field on the passage of current through the wire.

Also, there are other means of servo-feedback that can be utilized equally as well as that shown in the present drawings. FIGURE 11 illustrates an alternative means for applying a feedback force to the membrane. This utilizes a spiral coil 63 of very thin wire sealed to the surface of the membrane and the two leads from which passing to the output of the servo-feedback amplifier. In utilizing such a coil there is no need for electrostatic deflection plates because this coil is already mounted in a powerful magnetic field so that passage of current through the coil in one direction will move the membrane in an appropriate direction in the magnetic field, and passage of current through the coil in the opposite direction will move the membrane in the opposite direction in the magnetic field.

When electromagnetic feedback of this nature is applied, the instrument can be zeroed by adjusting the basal level of current flow through the coil of wire that is affixed to the membrane.

Another system modification is illustrated in FIGURE 12. In this system a high frequency oscillator 64, operating in the megacycle range, is used to impinge on the suspended membrane a very high frequency electrical signal. Within the magnetic air gap are two electrodes 65 and 66 on the two respective faces of the magnetic poles. If the membrane moves closer to electrode 66 than to 65, the discriminator 67 detects this and applies an appropriate electrostatic or electromagnetic signal back to the membrane to reposition it to its null position. The advantages of a system such as this would be elimination of a photoelectric system and therefore elimination of possible oscillation resulting from unstable mechanical linkage between the main body of the membrane and the extended portion that blocks the light through the photoelectric system.

In some uses of the instrument, such as in aircraft or in similar uses, it is important that the instrument not be sensitive to gravity. Under these conditions an alternative design of the instrument provides means for the membrane to be supported by straps hanging from a fulcrum, with the membrane counterbalanced on the opposite side of the fulcrum. When counterbalance is precise, the instrument then becomes insensitive to orientation in space. A electrostatic or electromagnetic means for zeroing the instrument is then used in place of the gravitational method for zeroing the instrument.

Figure 13:
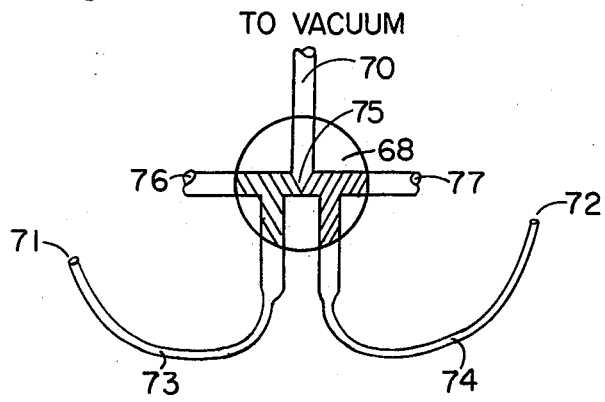
FIGURE 13 shows an alternate means by which the basic principle of the invention can be used to measure oxygen concentration differences between two gas samples, this time without the use of a membrane.

FIGURE 13 illustrates an alternate means by which the basic principle of this invention can be used to measure oxygen concentration difference between two gas samples, except that in this instance there is no membrane in the magnetic gap. The round circle 68 represents the face of one of the poles of the magnet facing the magnetic gap, and a tubular system lies in the magnetic gap. Air is pulled by a vacuum through tube 70. The two samples of gas are fed into inlet ports 71 and 72, respectively, and the two samples pass through resistance tubes 73 and 74. Where the two gases come together at area 75, an oxygen concentration gradient develops if the oxygen concentrations are different in the two samples of gases. This causes the development of a net force in the gas chamber in the direction from the high oxygen concentration toward the low oxygen concentration. The net effect of this is creation of a pressure differential between ports 76 and 77. This pressure differential in turn can be recorded by use of any standard differential manometer. The amount of force that develops between these two ports is in the order of only a few dynes, the exact value depending upon the strength of the magnetic field, the design of the tubular system in the magnetic gap, the rate of airflow through the tubular system, and the resistance in tubes 73 and 74 as well as the differential between the concentrations of oxygen in the two separate gases. This system has special advantages at very high oxygen partial pressures.

Obviously, many other appropriate electrical feedback systems could be devised to provide the force necessary to return the membrane to its null position. These are not essential departures from the basic invention but are merely different ways of applying the basic invention for practical purposes.

It is clear from the description of the details that many changes may be made which will not affect the essence of the invention.

Having described the invention, what is claimed as new is:

1. Means for measuring the difference between oxygen concentrations in two gas mixtures, each mixture containing oxygen mixed with non-magnetically active gases, comprising in combination: a magnet having a pair of pole pieces establishing a magnetic field in a gap therebetween; a membrane suspended by one edge and hanging between said pole pieces, thus separating said gap into two smaller spaces, one between each side of the membrane and a respective said pole piece; a suspending means for said membrane arranged for free rotation of said membrane from side to side about the axis of said suspending means; means to move at a constant rate a gas mixture through one of said spaces and a second gas mixture through the other said space; means to detect the force tending to rotate said membrane about said suspending means caused by imbalance of magnetic attraction of oxygen in the two respective spaces, the magnitude of said force being a measure of the difference between the oxygen concentrations in the two said gas mixtures and the direction of the force being from the gas mixture having the higher concentration of oxygen toward the gas mixture having the lower concentration of oxygen; and output means connected to the last mentioned means.

2. Means for measuring the difference between oxygen concentrations in two gas mixtures as described in claim 1 with the following additions in combination; a chamber enclosing said suspended membrane and said magnetic gap; means for causing a regulated degree of vacuum inside said chamber; a hole through the center of each said pole piece through which each of said respective gas mixtures is sucked by said vacuum causing the gas mixtures to enter the respective spaces on the respective sides of said membrane; and a tube of small bore offering high resistance to air flow connected to the outside port of said pole piece, this said resistance in combination with said regulated vacuum providing regulated flow of each said respective gas mixture into said respective space on each respective side of said membrane.

3. Means for measuring the difference between oxygen concentrations in two gas mixtures as described in claim 1 with the following additions in combination: a pinhole through the free end of said suspended membrane; a light located to one edge of said membrane, projecting light through said pinhole; a beam-splitting prism onto which the light projecting through said pin hole impinges so that minute movement of said membrane will cause marked change in percentage of light in two effluent beams from said prism; two photocells, one located in the pathway of each said effluent beam; a positive voltage source connected to one terminal of one of the said photocells, a negative voltage source connected to one terminal of the second said photocell, and the opposite terminals of the two said photocells connected together, the two photocells thus being balanced against each other so that the instantaneous electrical output at the connecting point between them is an indication of the instantaneous degree of displacement of the membrane; an electrode located on the face of each said magnetic pole piece but insulated from said pole piece; means providing positive and negative electrical potentials, with the positive electrical potential connected to one of said electrodes and the negative electrical potential connected to the other; and a D.C. servo amplifier connected to the electrical output of said balanced photocells, the output of said amplifier being connected to said membrane, the polarity of said amplified signal to be such that the generated electrostatic forces between said electrodes and said membrane will return said membrane to the original position whenever said membrane is displaced to one side or the other by imbalance of magnetic attraction of oxygen into the two said respective spaces on the two sides of said membrane, the electrical voltage at the output of said servo amplifier being a direct measure of oxygen concentration difference between the two sides of said membrane.

4. Means for measuring the difference between oxygen concentrations in two gas mixtures as described in claim 1 with the following additions in combination: electrodes on the faces of the two respective said pole pieces but insulated from the pole pieces; means to apply radio frequency alternating potentials to the two said electrodes so that the respective potentials on the electrodes are 180 degrees out of phase with each other; means to detect alternating potential induced capacitively in said membrane suspended between said electrodes, as well as means to detect the phase of said induced potential, thus detecting the relative movement of said membrane between the two said electrodes; means to convert said induced potential and phase into a direct current potential which is then also applied to said membrane; a source of electrical direct current potentials of appropriate polarity, one positive and one negative, applied to two said electrodes on the pole pieces so that electrostatic forces created between said membrane and said electrodes when said membrane is displaced from its original position by the presence of a difference in oxygen concentration between the two sides of the membrane will return the membrane to its original position; and output means connected to the direct current potential of said membrane to indicate magnitude of said oxygen concentration difference.

5. Means for measuring the difference between oxygen concentrations in two gas mixtures as described in claim 1 with the following additions in combination: swivel mounting on two bearings for magnet and its attached assembly so that said magnet and membrane suspension assembly can be rotated along an axis parallel to the axis of the membrane suspension, thereby allowing said membrane to be positioned by the pull of gravity to any desired reference position in said magnetic gap when the oxygen concentration difference between the gas mixtures on the two sides of said membrane is zero; and a friction surface at one of said bearings to hold said swivel mounting in a fixed position once adjusted.

6. Means for measuring the difference between oxygen concentrations in two gas mixtures as described in claim 1 with the following addition: counterbalance for said membrane on the opposite side of said suspending means, thus preventing linear acceleratory forces from rotating said membrane about axis of said suspending means, in this way isolating said output from errors caused by linear acceleration.

7. Means for measuring the difference between oxygen concentrations in two gas mixtures, each containing oxygen mixed with non-magnetically active gases, comprising in combination: a magnet having a pair of pole pieces establishing a magnetic field in a gap therebetween; a membrane suspended by one edge and hanging between said pole pieces, thus separating the gap into two smaller spaces, one between each side of the membrane and a respective said pole piece, a suspending means for said membrane arranged for free rotation of said membrane from side to side about the axis of said suspending means; means to move at a constant rate one gas mixture through one of said spaces and another gas mixture through the other said space; means to detect the rotational displacement of said membrane about said suspending means caused by imbalance of magnetic attraction of oxygen in the two respective spaces, the magnitude of the displacement being a measure of the difference between the oxygen concentrations in the two said gas mixtures and the direction of the displacement being from said gas mixture having the higher concentration of oxygen toward said gas mixture having the lower concentration of oxygen; and output means connected to the last mentioned means.

References Cited

UNITED STATES PATENTS 3,302,448   2/1967   Mocker _____ 73—23

ALFRED E. SMITH, Primary Examiner

U.S. Cl. X.R.

73—23; 324—61